United States Patent
Weber et al.

(10) Patent No.: US 6,197,869 B1
(45) Date of Patent: Mar. 6, 2001

(54) NON-FLAMMABLE, THERMOPLASTIC MOULDED MATERIALS WITH IMPROVED ANTI-DRIP PROPERTIES

(75) Inventors: Martin Weber, Maikammer; Peter Horn, Heidelberg; Robert Weiss, Kirchheim; Walter Heckmann, Weinheim; Roland Hingmann, Ladenburg, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/194,122

(22) PCT Filed: May 28, 1997

(86) PCT No.: PCT/EP97/02792

§ 371 Date: Nov. 23, 1998

§ 102(e) Date: Nov. 23, 1998

(87) PCT Pub. No.: WO97/45486

PCT Pub. Date: Dec. 4, 1997

(30) Foreign Application Priority Data

May 30, 1996 (DE) .............................................. 196 21 732

(51) Int. Cl.[7] .............................. C08J 3/00; C08K 3/04; C08L 25/04
(52) U.S. Cl. .......................................... 524/495; 524/496
(58) Field of Search ..................... 524/495, 496

(56) References Cited

U.S. PATENT DOCUMENTS

| | | | |
|---|---|---|---|
| 2,694,692 | 5/1954 | Amos | 260/45 |
| 2,862,906 | 12/1958 | Stein | 260/45 |
| 3,280,084 | 10/1966 | Zelinski et al. | 260/83 |
| 3,383,435 | 5/1968 | Cizek | 260/874 |
| 3,637,554 | 1/1972 | Childers | 260/23 |
| 3,639,508 | 2/1972 | Kambour | 260/876 |
| 3,660,531 | 5/1972 | Lauchlan et al. | 260/876 |
| 3,985,830 | 10/1976 | Fetters et al. | 260/880 |
| 3,994,856 | 11/1976 | Katchman et al. | 260/42 |
| 4,091,053 | 5/1978 | Kitchen | 260/880 |
| 4,107,232 | 8/1978 | Haaf et al. | 260/876 |
| 4,128,602 | 12/1978 | Katchman et al. | 260/876 |
| 4,128,603 | 12/1978 | Katchman et al. | 260/876 |
| 4,167,507 | 9/1979 | Haaf | 525/92 |
| 4,360,618 | 11/1982 | Trementozzi | 524/141 |
| 4,405,753 | 9/1983 | Deets et al. | 525/68 |
| 4,483,958 | 11/1984 | Kosaka et al. | 524/409 |
| 4,504,613 | * 3/1985 | Abolins et al. | 524/125 |
| 4,563,500 | 1/1986 | Haaf et al. | 525/99 |
| 4,698,369 | 10/1987 | Bell | 521/99 |
| 5,173,515 | 12/1992 | Von Bonin et al. | 521/103 |
| 5,760,115 | * 6/1998 | Okisaki et al. | 524/261 |
| 5,810,914 | * 9/1998 | Okisaki et al. | 106/18.14 |

FOREIGN PATENT DOCUMENTS

| | | |
|---|---|---|
| 080666 | 6/1983 | (EP) . |
| 297888 | 1/1993 | (EP) . |
| 794229 | 9/1997 | (EP) . |
| 1459648 | 12/1976 | (GB) . |
| 2060656 | 5/1981 | (GB) . |
| 83/01254 | 4/1983 | (WO) . |
| 87/00540 | 1/1987 | (WO) . |

OTHER PUBLICATIONS

Troitzsch, Intl. Plast. Flam. Hdbk, pp. 346–351, 1980.
Olabisi et al., Polymer–Polyme Miscibility, 1979, pp. 224–230 and 245.
Ullmann's Enz. der Tech. Chem., vol. 19, pp. 99–101, 122–124, 349–50, 1980.
Fried et al, Polymer Eng. Sci., 22, 1982, pp. 705–718.
Illers et al., Kolloid., 190 (1), 1963, pp. 16–34.

* cited by examiner

Primary Examiner—Patrick D. Niland
(74) Attorney, Agent, or Firm—Keil & Weinkauf

(57) ABSTRACT

Flame-retardant, thermoplastic molding materials containing
A) at least one polyphenylene ether,
B) at least one vinylaromatic polymer and
C) at least one flameproofing agent,
comprise
D) an amount of expandable graphite which increases the resistance of the molding material to dripping
and are used for the production of flame-retardant moldings, fibers and films.

8 Claims, No Drawings

NON-FLAMMABLE, THERMOPLASTIC MOULDED MATERIALS WITH IMPROVED ANTI-DRIP PROPERTIES

The present invention relates to flame-retardant thermoplastic molding materials having improved resistance to dripping, their use for the production of fibers, films and moldings, and the fibers, films and moldings produced therefrom.

Polymer blends comprising polyethylene ether (PPE) and styrene polymers are disclosed, for example, in U.S. Pat. Nos. 3,383,435, 4,128,602 and 4,128,603. Such molding materials are suitable for the production of shaped articles which are distinguished by a better heat distortion resistance compared with high impact polystyrene (HIPS) which is not blended with polyphenylene ethers. A detailed description of the properties of these polymer blends is also to be found in L. Bottenbruch, Technische Polymer-Blends, Kunststoff Handbuch 3/2, Hanser Verlag, Munich, 1993.

An important advantage of the polymer blends comprising a polyphenylene ether and styrene polymers is that molding materials which are flame-retardant and are therefore used for many applications in the area of electrical engineering can be prepared by adding halogen-free flame-proofing agents, phosphorus-containing compounds being mentioned in particular. With regard to the use in the area of electrical engineering, in particular the testing of the flame-retardancy according to UL 94 (in J. Troitzsch, International Plastics Flammability Handbook, page 346 et seq., Hanser Verlag, Munich, 1990) is critical. In this test, a flame is repeatedly applied to vertically fastened test specimens. The test specimen heats up to a very great extent, resulting in many cases in the dripping of burning polymer material which ignites the cotton wool pad mounted under the rod. This undesired behavior is observed particularly when large amounts of flameproofing agents have to be used to achieve short combustion times.

The problem of the dripping of burning particles in the UL 94 test has long been known and is solved in the industry generally by adding small amounts of Teflon as an antidrip agent (U.S. Pat. No. 4,107,232). However, attempts have recently been made completely to avoid the use of halogen-containing compounds in thermoplastic molding materials. However, suitable alternative antidrip agents have not been found to date.

EP 0 297 868 discloses the use of expandable graphite in combination with carbon black of a certain specification for establishing the conductivity of thermoplastic or heat-curable resins. The resins obtained according to EP 0 297 888 are suitable in particular for the production of electrically conductive materials, such as electrodes, and for shielding electromagnetic waves. However the problem of improving the resistance to dripping is not tackled therein.

JO 3181 532 likewise disclosed the use of expandable graphite for thermoplastic molding materials. However, no flame-retardant molding materials are described therein. The purpose of adding graphite according to JO 3181 532 was to improve the electrical conductivity as well as the thermal conduction and frictional properties.

It is an object of the present invention to provide flame-proofed thermoplastic molding materials, in particular molding materials based on polyphenylene ethers and styrene polymers, with resistance to dripping has been improved by the addition of a halogen-free antidrip agent.

We have found that this object is achieved and that, surprisingly, the addition of an amount of expandable graphite which increases the resistance to dripping, in particular of from about 0.5 to about 10% by weight of expandable graphite, can reduce the dripping of flame-retardant molding materials. According to the invention, it is possible in particular to obtain molding materials based on PPE and HIPS whose resistance to dripping has been substantially increased. In the fire test according to UL 94, these novel molding materials can achieve the classification V 0.

This result is all the more surprising since neither EP 0 297 888 nor JO 31 81 532 gives any indication that the fire behavior and in particular the dripping behavior of thermoplastic molding materials, for example molding materials comprising polyphenylene ethers and high impact polystyrene, can be improved simply by means of expanded graphite.

The present invention therefore relates to flame-retardant, thermoplastic molding materials containing a thermoplastic resin based on one or more polyphenylene ethers and at least one vinylaromatic polymer, a flameproofing agent and an amount of expandable graphite which increases the resistance to dripping of the molding material. Preferably, the expandable graphite is present in an amount of from about 0.5 to about 10, preferably from about 0.5 to about 9, in particular from about 0.5 to about 7.5, % by weight, based on the total weight of the molding material.

An advantageous embodiment of the invention provides a thermoplastic, flame-retardant molding material which contains, based in each case on the total weight of the molding material A) from about 5 to about 97.5% by weight of polyphenylene ether,
B) from about 1 to about 93.5% by weight of styrene polymer,
C) from about 1 to about 20% by weight of flame-proofing agent,
D) from about 0.5 to about 10% by weight of expandable graphite,
E) from about 0 to about 50% by weight of impact modifier and
F) from about 0 to about 60% by weight of conventional additives.

The preferably provided molding material is one which contains, based in each case on the total weight of the molding material, A) from about 15 to about 87.5% by weight of polyphenylene ether,
B) from about 10 to about 82.5% by weight of styrene polymer,
C) from about 2 to about 19% by weight of flame-proofing agent,
D) from about 0.5 to about 9% by weight of expandable graphite,
E) from about 0 to about 25% by weight of impact modifier and
F) from about 0 to about 50% by weight of conventional additives.

A particularly preferred molding material is one which contains, based on the total weight of the molding material, A) from about 20 to about 82% by weight of polyphenylene ether,
B) from about 15 to about 77% by weight of styrene polymer,
C) from about 2.5 to about 18% by weight of flame-proofing agent,
D) from about 0.5 to 7.5% by weight of expandable graphite,
E) from about 0 to about 20% by weight of impact modifier and
F) from about 0 to about 30% by weight of conventional additives.

According to the invention, at least one polyphenylene ether known per se is used as component A). These are in particular compounds based on substituted, in particular disubstituted, polyphenylene ethers, the ether oxygen of one unit being bonded to the benzene nucleus of the neighboring unit. Polyphenylene ethers substituted in the 2- and/or 6-position relative to the oxygen atom are preferably used. Examples of substituents are halogen, such as chlorine or bromine, and alkyl of 1 to 4 carbon atoms which preferably has no a tertiary hydrogen atom, e.g. methyl, ethyl, propyl or butyl. The alkyl radicals may in turn be substituted by halogen, such as chlorine or bromine, or by hydroxyl. Further examples of possible substituents are alkoxy, preferably of up to 4 carbon atoms, such as methoxy, ethoxy, n-propoxy and n-butoxy, or phenyl which is unsubstituted or substituted by halogen and/or by alkyl. Also suitable are copolymers of various phenols, for example copolymers of 2,6-dimethylphenol and 2,3,6-trimethylphenol. Mixtures of different polyphenylene ethers can of course also be used.

Examples of polyphenylene ethers are poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly-(2,6-dichloro-1,4-phenylene ether), poly(2-methyl-6-phenyl-1,4-phenylene ether), poly(2,6-dibenzyl-1,4-phenylene ether), poly(2-ethoxy-1,4-phenylene ether), poly-(2-chloro-1,4-phenylene ether) and poly(2,5-dibromo-1,4-phenylene ether). Preferably used polyphenylene ethers are those in which the substituents are alkyl of 1 to 4 carbon atoms, such as poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether) and poly(2-ethyl-6-propyl-1,4-phenylene ether).

For the purposes of the present invention, polyphenylene ethers are also to be understood as meaning those which are modified with monomers, such as fumaric acid, maleic acid or maleic anhydride.

Such polyphenylene ethers are described, inter alia, in WO 87/00540.

Regarding the physical properties of the polyphenylene ethers, those which have a weight average molecular weight Mw of from about 8000 to about 70,000, preferably from about 12,000 to about 60,000, in particular from about 25,000 to about 50,000, are used in the compositions. This corresponds to an intrinsic viscosity of about 0.18 to about 0.7, preferably from about 0.25 to about 0.62 and in particular from about 0.39 to about 0.55 dl/g, measured in chloroform at 25° C.

The molecular weight distribution is determined in general by means of gel permation chromatography (0.8×50 cm Shodex separation column of the type A 803, A 804 and A 805 with THF as eluent at room temperature). The PPE samples are dissolved in THF under pressure at 110° C., 0.16 ml of a 0.25% by weight solution being injected. Detection is effected in general using a UV detector. The calibration of the columns was carried out using PPE samples whose absolute molecular weight distributions were determined by a GPC/laser light scattering combination.

The component B) is preferably a toughened vinylaromatic polymer which is advantageously compatible with the polyphenylene ether used.

Examples of preferred vinylaromatic polymers compatible with polyphenylene ethers are stated in the monograph by O.Olabisi, Polymer-Polymer Miscibility, 1979, pages 224 to 230 and 245.

Both homopolymers and copolymers of vinylaromatic monomers of 8 to 12 carbon atoms, which are prepared in the presence of a rubber, are suitable. The rubber content is from about 5 to about 25, preferably from about 8 to about 17, % by weight, based on the weight of the component B).

Suitable high impact polystyrenes are for the most part commercially available and have a viscosity number (VN) of the hard matrix of from about 50 to about 130, preferably from about 60 to about 90, ml/g (0.5% strength in toluene at 23° C.).

Particularly suitable monovinylaromatic compounds are styrene and the styrenes substituted on the nucleus and on the side chain. Preferred substituents are halogen, in particular chlorine and bromine, hydroxyl, and $C_{1-4}$ alkyl, such as methyl, ethyl, n-propyl, isopropyl, n-butyl and tert-butyl. Examples of these compounds are chlorostyrene, a-methylstyrene, styrene, p-methylstyrene, vinyltoluene and p-tert-butylstyrene. However, styrene alone is preferably used.

The homopolymers are generally prepared by the known mass, solution or suspension processes (cf. Ullmanns Enzyklopädie der techn. Chemie, Volume 19, pages 265 to 272, Verlag Chemie, Weinheim 1980). The homopolymers may have weight average molecular weights Mw of from about 3000 to about 300,000, which can be determined by conventional methods.

Examples of suitable comonomers for the preparation of copolymers are (meth)acrylic acid, alkyl (meth)acrylates where the alkyl radical is of 1 to 4 carbon atoms, acrylonitrile and maleic anhydride as well as maleimides, acrylamide and methacrylamides and their N,N- or N-alkyl-substituted derivatives in which the alkyl radical is of 1 to 10 carbon atoms. Examples of $C_1$–$C_{10}$-alkyl radicals include $C_1$–$C_4$-alkyl of the above definition and n-pentyl, n-hexyl, n-heptyl, n-octyl, n-nonyl, n-decyl and their branched analogs.

The comonomers are contained in the styrene polymers in different amounts depending on their chemical structure. The miscibility of the copolymer with the polyphenylene ether is critical with regard to the content of comonomers in the copolymer. Such miscibility limits are known and are described, for example, in U.S. Pat. Nos. 4,360,618 and 4,405,753 and in the publication by J. R. Fried and G. A. Hanna, Polymer Eng. Sci. 22 (1982), 705 et seq. The copolymers are prepared by known processes which are described, for example, in Ullmanns Enzyklopädie der technischen Chemie, Volume 19, page 273 et seq., Verlag Chemie, Weinheim (1980). The copolymers have in general weight average molecular weights (Mw) of from about 10,000 to about 300,000, which can be determined by conventional methods.

The component B) is particularly preferably high impact polystyrene.

The generally used processes for the preparation of high impact polystyrenes are mass or solution polymerization in the presence of a rubber, as described, for example, in U.S. Pat. No. 2,694,692, and mass suspension polymerization processes, as described, for example, in U.S. Pat. No. 2,862,906. Other processes can of course also be used provided that the desired particle size of the rubber phase is established.

The natural or synthetic rubbers usually used for toughening styrene polymers are used as the rubber. Suitable rubbers for the purposes of the present invention in addition to natural rubber are, for example, polybutadiene, polyisoprene and copolymers of butadiene and/or of isoprene with styrene and other comonomers, which have a glass transition temperature, determined according to K. H. Illers and H.

Breuer, Kolloidzeitschrift 190 (1) (1963) 16–34, of less than −20° C. According to the invention, mixtures of different toughened polymers of the above definition may also be used.

The novel molding materials may contain, as component C), the following compounds C1, C2 and C3 individually or as a mixture:

C1) Phosphine oxide of the formula (I)

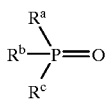
(I)

where $R^a$, $R^b$ and $R^c$ are identical or different and are selected from hydrogen and straight-chain or branched, unsubstituted or substituted alkyl, aryl, alkylaryl or cycloalkyl groups of up to 40 carbon atoms.

Preferred alkyl radicals here are $C_1$–$C_{20}$-alkyl, in particular $C_1$–$C_{12}$-alkyl, e.g. methyl, ethyl, n-propyl, n-butyl, neopentyl, n-hexyl, n-octyl, n-nonyl, n-dodecyl, 2-ethylhexyl, 3,5,5-tri-methylhexyl and substituted alkyl radicals, such as cyanoethyl.

Preferred aryl radicals are phenyl and naphthyl as well as monosubstituted or polysubstituted radicals, such as tolyl, xylyl, mesityl and cresyl.

Preferred alkylaryl radicals are $C_1$–$C_{20}$-alkylaryl, in particular $C_1$–$C_{12}$-alkylaryl, the alkyl moiety and aryl moiety being as defined above.

Preferred cycloalkyl groups include $C_3$–$C_{10}$-cycloalkyl, such as cyclobutyl, cyclopentyl, cyclohexyl and cycloheptyl.

Suitable substituents are cyano, hydroxy, $C_1$–$C_4$-alkyl and halogen, such as F, Cl, Br and I.

C2) Phosphate of the formula (II)

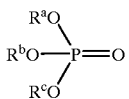
(II)

in which the substituents $R^a$, $R^b$ and $R^c$ are identical or different and have the abovementioned meanings, and C3) a boron compound.

Examples of phosphine oxides C1) are triphenylphosphine oxide, tritolylphosphine oxide, trisnonylphenylphosphine oxide, tricyclohexylphosphine oxide, tris(n-butyl) phosphine oxide, tris(n-hexyl)phosphine oxide, tris(n-octyl) phosphine oxide, tris(cyanoethyl)phosphine oxide, benzylbis(cyclohexyl)phosphine oxide, benzylbisphenylphosphine oxide and phenylbis(n-hexyl)-phosphine oxide. Triphenylphosphine oxide, tricyclohexylphosphine oxide, tris(n-octyl)phosine oxide and tris(cyanoethyl) phosphine oxide are particularly preferably used.

Particularly suitable phosphates C2) are alkyl- and aryl-substituted phosphates. Examples are phenyl bisdodecyl phosphate, phenyl bisneopentyl phosphate, phenyl ethyl hydrogen phosphate, phenyl bis(3,5,5-trimethylhexyl) phosphate, ethyl diphenyl phosphate, bis(2-ethylhexyl) p-tolyl phosphate, tritolyl phosphate, trixylyl phosphate, trimesityl phosphate, bis(2-ethylhexyl) phenyl phosphate, tris(nonylphenyl) phosphate, bis(dodecyl) p-tolyl phosphate, tricresyl phosphate, triphenyl phosphate, dibutyl phenyl phosphate, p-tolyl bis(2,5,5-trimethylhexyl) phosphate and 2-ethylhexyl diphenyl phosphate. Phosphorus compounds in which each of the radicals $R^a$, $R^b$ and $R^c$ is an aryl radical are particularly suitable. Triphenyl phosphate, trixylyl phosphate and trimesityl phosphate are very particularly suitable. Cyclic phosphates may also be used. Particularly suitable here is diphenyl pentaerythrityl diphosphate.

Particularly preferred mixtures of the following phosphine oxide C1) and phosphate C2) combinations are: triphenylphosphine oxide/triphenyl phosphate or trixylyl phosphate, tricyclohexylphosphine oxide and triphenyl phosphate, tris(cyanoethyl)phosphine oxide and triphenyl phosphate, and tris(n-octyl)phosphine oxide and triphenyl phosphate. Mixtures of a plurality of phosphine oxides and phosphates may also be used, for example the mixture comprising triphenylphosphine oxide, triphenyl phosphate and trixylyl phosphate.

The molecular weight is in general not more than about 1000, preferably from about 150 to about 800.

According to the invention, boron compounds C3) are to be understood as meaning both inorganic and organic boron compounds.

Examples of inorganic boron compounds are boric acid, $B_2O_3$ and salts of boric acid, preferably with alkali metals or alkaline earth metals. Boric acid, sodium borate and boron oxide are particularly preferred.

Organic boron compounds C3) are, for example, tetraphenyl borates, such as sodium tetraphenylborate, and tribenzyl borate.

In the case of a mixture of C1, C2 and C3, the composition of the component C) is in general, based on the content of the total component C):

C1) from 1 to 98.9, preferably from 10 to 85, in particular from 20 to 70, % by weight C2) from 1 to 98.9, preferably from 10 to 85, in particular from 20 to 70, % by weight C3) from 0.1 to 70, preferably from 5 to 50, in particular from 10 to 30, % by weight.

Other suitable components C) are organophosphorus compounds of the formulae (IV), (V) and (VI)

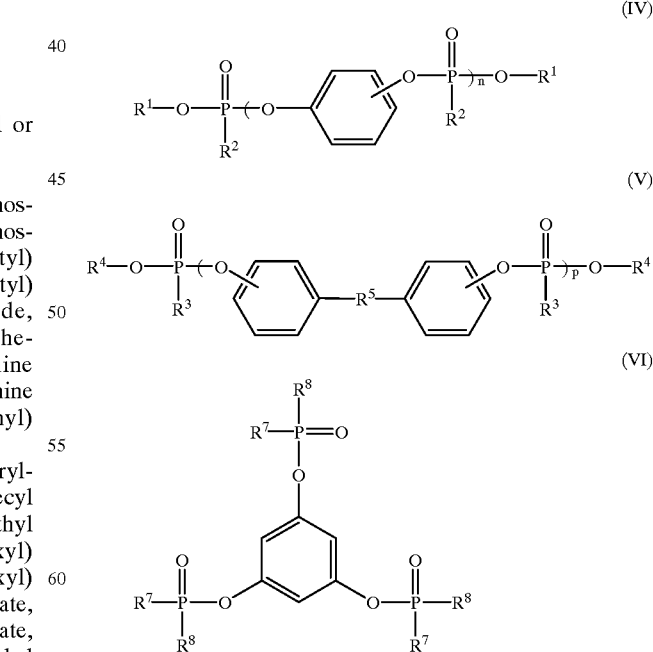

where $R^1$ and $R^4$, independently of one another, are each unsubstituted or substituted alkyl or aryl;

$R^2$, $R^3$, $R^7$ and $R^8$, independently of one another, are each unsubstituted or substituted alkyl, aryl, alkoxy or aryloxy, $R^5$ is alkylene, —$SO_2$—, —CO—, —N=N— or —($R^6$)P(O)—, where $R^6$ is unsubstituted or substituted alkyl, aryl or alkylaryl, and n and p, independently of one another, are each from 1 to 30.

Suitable substituents in compounds of the formulae (IV), (V) and (VI) are cyano, hydroxyl, $C_1$–$C_4$-alkyl and halogen, such as F, Cl, Br or I.

Preferred alkyl radicals in compounds of the formula (IV), (V) and (VI) are $C_1$–$C_{20}$-alkyl, in particular $C_1$–$C_{12}$-alkyl, e.g. methyl, ethyl, n-propyl, n-butyl, neopentyl, n-hexyl, n-octyl, n-nonyl, n-dodecyl, 2-ethylhexyl, 3,5,5-trimethylhexyl and cyanoethyl.

Preferred aryl radicals in compounds of the formulae (IV), (V) and (VI) are phenyl and naphthyl and monosubstituted or polysubstituted radicals, such as tolyl, xylyl, mesityl and cresyl.

Preferred alkylaryl radicals in compounds of the formulae (IV), (V) and (VI) are $C_1$–$C_{20}$-alkylaryl, in particular $C_1$–$C_{12}$-alkylaryl, the alkyl moiety and aryl moiety being as defined above.

Preferred cycloalkyl groups in compounds of the formulae (IV), (V) and (VI) include $C_3$–$C_{10}$-cycloalkyl, such as cyclobutyl, cyclopentyl, cyclohexyl and cycloheptyl.

Preferred alkoxy radicals in compounds of the formulae (IV), (V) and (VI) are $C_1$–$C_{20}$-alkoxy, the $C_1$–$C_{20}$-alkyl moiety being as defined above.

Preferred aryloxy radicals in compounds of the formulae (IV), (V) and (VI) are those in which the aryl moiety is as defined above.

Preferred alkylene radicals in compounds of the formulae (IV), (V) and (VI) are $C_1$–$C_6$-alkylene, such as methylene, ethylene, propylene and hexylene.

The preparation of phosphoric esters is generally described in Houben-Weyl, Methoden der organischen Chemie, vol. XII/2, Thieme Verlag, 1972. The compounds used according to the invention are preferably obtained by transesterification under base catalysis or by reaction of phosphoryl chloride with phenols under catalysis by magnesium chloride or aluminum chloride. Preferred compounds of the formula (IV) are the commercial products based on hydroquinone diphenyl phosphate or resorcinol diphenyl phosphate. Preferred compounds of the formula (V) are obtained by reacting a bisphenol (cf. for example Ullmann's Encyclopedia of Industrial Chemistry, 5th edition, vol. A19, page 349), e.g. bisphenol A or S, with triphenyl phosphate under base catalysis.

In this context, it should be noted that the industrially available products are mixtures of different oligomers or isomers.

Furthermore, mixtures of the higher phosphates and monophosphates or monophosphine oxides in any ratio may be used.

The molding materials contain expandable graphite as component D).

As is known to the person skilled in the art, graphite can form intercalation compounds owing to its layer structure (also cf.: Römpp, Chemie-Lexikon, 9th edition, vol. 2, page 1642 et seq., Thieme-Verlag, Stuttgart, 1990).

The intercalated component is included in a regular manner between the layers of the graphite. On intercalation of the component, expansion of the graphite in the direction of c axis also takes place. This intercalation is generally reversible, i.e. liberation of the intercalated component is possible at higher temperatures. Particularly suitable intercalation compounds contain at least about 10% by weight of inert compounds which are liberated at a temperature of at least about 240° C., preferably more than about 250° C. Suitable inert compounds are, for example, water, carbon dioxide, sulfide trioxide and nitrogen.

The preparation of such intercalation compounds is known to a person skilled in the art. For the preparation of intercalation compounds, graphite powder is treated with the gaseous or liquid component under pressure (cf. Ullmann's Encyclopedia of Industrial Chemistry, A5, 1986, page 99 et seq. and page 122 et seq.). On heating, the intercalated compound is liberated, it being possible for the volume to increase by a factor of 200 (cf. product publication Expandable Graphite from Chuo Kasei Co., Ltd.).

Rubber impact modifiers are preferably used as component E).

In addition to the rubber-containing component B, natural or synthetic rubbers may be used as component E. In addition to natural rubber, other suitable impact modifiers are, for example, polybutadiene, polyisoprene or copolymers of butadiene and/or isoprene with styrene and other comonomers, which have a glass transition temperature, determined according to K. H. Illers and H. Breuer, Kolloidzeitschrift 190 (1) (1963), 16–34, of from about –100° C. to +25° C., preferably less than 0° C. Appropriately hydrogenated products may also be used.

Preferred impact modifiers E are block copolymers of vinylaromatics and dienes. Impact modifiers of this type are known. German Published Applications DE-AS 1,932,234 and DE-AS 2,000,118 and German Laid-Open Application DOS 2,255,930 describe vinylaromatic and elastomeric block copolymers comprising diene blocks and having different compositions. The use of corresponding hydrogenated block copolymers, if necessary as a mixture with the non-hydrogenated precursor, as impact modifiers is described, for example, in German Laid-Open Applications DOS 2,750,515, DOS 2,434,848 and DOS 3,038,551, EP-A-0 080 666 and WO 83/01254.

In particular, vinylaromatic/diene block copolymers comprising blocks which contain a hard phase (block type S) and, as the soft phase, a block B/S comprising diene and vinylaromatic units and having a random composition can be used according to the invention. The composition can be homogeneous or inhomogeneous along the chain as a statistical average.

Such an elastomeric block copolymer suitable according to the invention is obtained by forming the soft phase from a random copolymer of a vinylaromatic with a diene; random copolymers of vinylaromatics and dienes are obtained by polymerization in the presence of a polar cosolvent.

A block copolymer which can be used according to the invention may be, for example, of one of the following formulae (1) to (11):

(1) $(S\text{-}B/S)_n$;
(2) $(S\text{-}B/S)_n\text{-}S$;
(3) $B/S\text{-}(S\text{-}B/S)_n$;
(4) $X\text{-}[(S\text{-}B/S)_n]_m+1$
(5) $X\text{-}[(B/S\text{-}S)_n]_m+1$;
(6) $X\text{-}[(S\text{-}B/S)_n\text{-}S]_m+1$;
(7) $X\text{-}[(B/S\text{-}S)_n\text{-}B/S]_m+1$;
(8) $Y\text{-}[(S\text{-}B/S)_n]_m+1$;
(9) $Y\text{-}[(B/S\text{-}S)_n]_m+1$;
(10) $Y\text{-}[(S\text{-}B/S)_n\text{-}S]_m+1$;
(11) $Y\text{-}[(B/S\text{-}S)_n\text{-}B/S]_m+1$;
where
S is a vinylaromatic block,
B/S is the soft phase comprising a block randomly composed of diene and vinylaromatic units, X is a radical of an n-functional initiator,
Y is a radical of an m-functional coupling agent and
m, n are natural numbers from 1 to 10.

A block copolymer of one of the formulae S-B/S-S, X-[-B/S-S]$_2$ and Y-[-B/S-S]$_2$ (meanings of the abbreviations as above) is preferred and a block copolymer whose soft phase is divided into the blocks
(12) (B/S)$_1$-(B/S)$_2$;
(13) (B/S)$_1$-(B/S)$_2$-(B/S)$_1$;
(14) (B/S)$_1$-(B/S)$_2$-(B/S)$_3$;
is particularly preferred, the indices 1, 2, 3 representing different structures in the sense that the vinylaromatic/diene ratio is different in the individual blocks B/S or changes continuously within the limits (B/S)$_1$(B/S)$_2$ within a block, and the glass transition temperature $T_g$ of each part-block being less than 25° C.

A block copolymer which has a plurality of blocks B/S and/or S having a different molecular weight for each molecule is also preferred.

Furthermore, block S composed exclusively of vinylaromatic units can be replaced by a block B, since all that is important is that an elastomeric block copolymer is formed. Such copolymers can have, for example, one of the structures (15) to (18)
(15) B-(B/S)
(16) (B/S)-B-(B/S)
(17) (B/S)$_1$-B-(B/S)$_2$
(18) B-(B/S)$_1$-(B/S)$_2$.

Preferred vinylaromatics are styrene, o-methylstyrene, vinyltoluene and mixtures of these compounds. Preferred dienes are butadiene, isoprene, piperylene, 1-phenylbutadiene and mixtures of these compounds. A particularly preferred monomer combination comprises butadiene and styrene.

The soft blocks are particularly preferably composed of from about 25 to 75% by weight of styrene and from about 25 to 75% by weight of butadiene.

Particularly preferred soft blocks are those which have a butadiene content of from about 34 to 69% by weight and a styrene content of from about 31 to 66% by weight.

In the case of the styrene/butadiene monomer combination, the amount by weight of the diene in the total block copolymer is from 15 to 65% by weight and that of the vinylaromatic component is accordingly from 85 to 35% by weight. Butadiene/styrene block copolymers having a monomer composition comprising from 25 to 60% by weight of diene and from 75 to 40% by weight of vinylaromatic compound are particularly preferred.

The block copolymers are obtainable by anionic polymerization in a nonpolar solvent with the addition of a polar cosolvent. It is considered that the cosolvent acts as a Lewis base with respect to the metal cation. Aliphatic hydrocarbons, such as cyclohexane or methylcyclohexane, are preferably used as solvents. Polar aprotic compounds, such as ethers and tertiary amines, are preferred as Lewis bases. Examples of particularly effective ethers are tetrahydrofuran and aliphatic polyethers, such as diethylene glycol dimethyl ether. Examples of tertiary amines are tributylamine and pyridine. The polar cosolvent is added to the nonpolar solvent in a small amount, for example from 0.5 to 5% by volume. Tetrahydrofuran in an amount of from 0.1 to 0.3% by volume is particularly preferred. Experience has shown that an amount of about 0.2% by volume is sufficient in most cases.

The copolymerization parameters and the proportion of 1,2- and 1,4-linkages of the diene units are determined by the dose and structure of the Lewis base. The novel polymers contain, for example, from 15 to 40% of 1,2-linkages and from 85 to 60% of 1,4-linkages, based on all diene units.

The anionic polymerization is initiated by means of organo-metallic compounds. Compounds of the alkali metals, in particular of lithium, are preferred. Examples of initiators are methyllithium, ethyllithium, propyllithium, n-butyllithium, sec-butyllithium and tert-butyllithium. The organometallic compound is added as a solution in a chemically inert hydrocarbon. The dose depends on the intended molecular weight of the polymer but is as a rule from 0.002 to 5 mol %, based on the monomers.

The polymerization temperature may be from about 0 to 130° C. The temperature range from 30 to 100° C. is preferred.

The volume fraction of the soft phase in the solid is of decisive importance with regard to the mechanical properties. According to the invention, the volume fraction of the soft phase composed of diene and vinylaromatic sequences is from 60 to 95, preferably from 70 to 90, particularly preferably from 80 to 90, % by volume. The blocks A formed from the vinylaromatic monomers constitute the hard phase whose volume fraction is accordingly from 1 to 40, preferably from 10 to 30, particularly preferably from 10 to 20, % by volume.

It should be pointed out that there is no stringent agreement between the abovementioned ratios of vinylaromactic compound and diene, the abovementioned limits of the phase volumes and the composition which arises out of the glass transition temperature ranges according to the invention, since the numerical values in question have been rounded to full units of ten. Any agreement is likely to be accidental.

The volume fraction of the two phases can be measured by means of high-contrast electron microscopy or solid-state NMR spectroscopy. The proportion of the vinylaromatic blocks can be determined by precipitation and weighing after osmium degradation of the polydiene fraction. The future phase ratio of a polymer can also be calculated from the amounts of monomers used if polymerization is allowed to go to completion each time.

The block copolymer is uniquely defined for the purposes of the present invention by the quotient of the volume fraction in percent of the soft phase formed from the B/S block and the fraction of diene units in the soft phase, which is from 25 to 70% by weight for the combination styrene/butadiene.

The glass transition temperature ($T_g$) is influenced by the random incorporation of the vinylaromatic compounds into the soft block of the block copolymer and the use of Lewis bases during the polymerization. The glass transition temperature of the total copolymer is preferably from −50 to +25° C., preferably less than 0° C.

The molecular weight of the block S is preferably from 1000 to 200,000, in particular from 3000 to 80,000 [g/mol]. Within a molecule, S blocks may have different molar masses.

The molecular weight of the block B/S is usually from 2000 to 45 250,000, preferably from 5000 to 150,000 [g/mol].

Like block S, block B/S, too, can have different molecular weight values within a molecule.

The coupling center X is formed by the reaction of the living anionic chain ends with a bifunctional or polyfunctional coupling agent. Examples of such compounds are to be found in U.S. Pat. Nos. 3,985,830, 3,280,084, 3,637,554 and 4,091,053. For example, epoxidized glycerides, such as epoxidized linseed oil or soybean oil, are preferably used;

divinylbenzene is also suitable. Dichlorodialkylsilanes, dialdehydes, such as terephthalaldehyde, and esters, such as ethylformate or benzoate, are especially suitable for dimerization.

Preferred polymer structures are S-B/S-S, X-[-B/S-S]$_2$ and Y-[-B/S-S]$_2$, where the random block B/S itself can in turn be subdivided into blocks B1/S1-B2/S2-B3/S3- . . . Preferably, the random block consists of from 2 to 15 random part-blocks, particularly preferably of from 3 to 10 part-blocks. The division of the random block B/S into as many part-blocks Bn/Sn as possible has a decisive advantage that, even in the case of a composition gradient within a part-block Bn/Sn, as is difficult to avoid in the anionic polymerization under practical conditions, the B/S block as a whole behaves like a virtually perfect random polymer. It is therefore possible to add less than the theoretical amount of Lewis base, which increases the proportion of 1,4-diene linkages, decreases the glass transition temperature $T_g$ and reduces the susceptibility of the polymer to crosslinking. A larger or a smaller amount of part-blocks can be provided with a high diene content. As a result of this, the polymer retains a residual toughness and does not become completely brittle, even below the glass transition temperature of the predominant B/S blocks.

All abovementioned weight and volume data are based on the monomer combination butadiene/styrene. However, these data can be directly converted for other monomers technically equivalent to styrene and butadiene.

The block copolymers can be worked up by protonating the carbanions with an alcohol, such as isopropanol, acidifying the reaction mixture, for example, with a mixture of $CO_2$ and water, and removing the solvent. The block copolymers may contain antioxidants and antiblocking agents.

Mixtures of the above rubbers may also be used in the novel molding materials.

The novel molding materials may, if required, contain conventional additives and processing assistants as component F).

Examples of suitable additives are heat stabilizers and light stabilizers, lubricants and mold release agents, colorants, such as dyes and pigments, in conventional amounts. Further additives are reinforcing materials, such as glass fibers, asbestos fibers, carbon fibers, aromatic polyamide fibers and/or fillers, such as gypsum fibers, synthetic calcium silicates, kaolin, calcined kaolin, wollastonite, talc and chalk.

Low molecular weight or high molecular weight polymers are also suitable as additives, polyethylene wax being particularly preferred as lubricant.

Examples of suitable pigments are $TiO_2$ and carbon blacks.

When $TiO_2$ is used, the mean particle size is from about 50 to 400 nm, in particular from about 150 to 240 nm. Rutiles and anatase are used industrially and may be coated with metal oxides, for example aluminum oxide, silicon oxides, zinc oxides or siloxanes.

Carbon blacks include microcrystalline, finely divided carbon (cf. Kunststofflexikon, 7th edition 1980). Furnace blacks, acetylene blacks, gas blacks and the thermal carbon blacks obtainable by thermal preparation are suitable. The particle sizes are preferably from about 0.01 to 0.1 $\mu$m and the surface areas from about $10^2$ to $10^4$ m$^2$/g (BET/ASTM D 3037), and from about $10^2$ to $10^3$ ml/100 g in the case of DBP absorption (BET/ASTM d 2414).

The desired properties of the end products can be controlled to a large degree through the type and amount of these additives.

The novel molding materials are advantageously prepared by mixing the components at from 230 to 320° C. in a conventional mixing apparatus, for example a kneader, a Banbury mixer or a single-screw extruder, preferably with a twin-extruder extruder, but it should be noted that the processing must be carried out below the temperature at which liberation of the inert compound takes place. Thorough mixing is necessary to obtain a very homogeneous molding material. The order in which the components are mixed may be varied; two, or if required, a plurality of components may be premixed or all components may be mixed together.

Moldings which are flame-retardant and do not tend to drip burning particles in the fire test according to UL 94 can be produced from the novel molding materials, for example by injection molding or extrusion.

The novel molding materials are very suitable for the production of shaped articles of all types, for example by injection molding or extrusion. They may furthermore be used for the production of films and semifinished products by the thermalforming or blow molding method.

EXAMPLES

The novel molding materials 1, 2 and 3 and, for comparative purposes, the molding materials V1 and V2 are prepared using the components A) to F) mentioned below and are tested.

Component A)
  Poly-2,6-dimethyl-1,4-phenylene ether having an average molecular weight ($M_W$) of 40,000 g/mol.
Component $B_1$)
  High impact polystyrene containing 9% by weight of polybutadiene and having cellular particle morphology and a mean particle size of the soft component of 1.9 $\mu$m. The VZ of the hard matrix was 80 ml/g (0.5% strength in toluene at 23° C.).
Component $B_2$)
  High impact polystyrene containing 11% by weight of polybutadiene and having cellular particle morphology and a mean particle size of the soft component of 3.5 $\mu$m. The VZ of the hard matrix was 80 ml/g (0.5% strength in toluene at 23° C.).
Component C)
  Resorcinol diphosphate, e.g. Fyroflex RDP (Akzo).
Component D)
  Expandable graphite, e.g. Sigraflex FR 90-60/80.
Component E)
  SEBS block rubber Kraton G 1650 (Shell AG).
Component F)
  Black Pearls 880 carbon black (as 15% strength batch in polystyrene, VZ =80 ml/g 0.5% strength in toluene at 23° C.).

Preparation of the thermoplastic molding material

The components A) to F) were mixed in a twin-screw extruder (ZKS 30 from Werner & Pfleiderer) at 240° C., the mixture was extruded and the extrudate was cooled and granulated.

The dried granules were processed at from 240 to 260° C. to give circular disks, flat bars for the UL 94 test and standard small bars.

The damaging energy WS was determined according to DIN 53 443 at 23° C. The heat distortion resistance of the samples was determined by means of the Vicat softening temperature, measured according to DIN 53 460 with a force of 49.05 N and a temperature increase of 50 K per hour, using standard small bars.

The flame retardancy and the dripping behavior were determined according to UL 94 on 1/16" thick bars; the combustion times mentioned are the sum of the combustion times of two flame applications.

The compositions and properties of the thermoplastic molding materials are listed in Table 1.

TABLE 1

| Molding material No. | V1 | 1 | 2 | V2 | 3 |
|---|---|---|---|---|---|
| Component [% by weight] | | | | | |
| A | 40 | 39,1 | 38,3 | 32 | 30,5 |
| B$_1$ | 47 | 46.0 | 44.9 | 44.2 | 42.0 |
| B$_2$ | — | — | — | 2.5 | 2.4 |
| C | 10 | 10 | 12 | 14 | 14 |
| D | — | 2 | 2 | — | 4 |
| E | 3 | 2,9 | 2.8 | 4 | 3.8 |
| F | — | — | — | 3.3 | 3.3 |
| W$_s$ [Nm] | 34 | 28 | 29 | 24 | 23 |
| Vicat B [° C.] | 111 | 110 | 108 | 94 | 91 |
| UL 94 | V-2 | V-1 | V-O | V-2 | V-1 |
| Combustion time [s] | 74 | 76 | 42 | 154 | 89 |
| Bars dripped | 5 | 0 | 0 | 5 | 0 |

The tests demonstrate the surprisingly high efficiency of component D) as antidrip agent.

We claim:

1. A flame-retardant, thermoplastic molding material containing

A) at least on e polyphenylene ether,

B) at least one vinylaromatic polymer and

C) at least one flameproofimg agent other than red phosphorus, wherein said molding material furthermore comprises D) an amount of expandable graphite which increases the resistance of the molding material to dripping.

2. A molding material as claimed in claim 1, wherein the expandable graphite is present in an amount of from about 0.5 to about 10% by weight.

3. A molding material as claimed in claim 2, containing, based in each case on the total weight of the molding material, A) from about 5 to about 97.5% by weight of polyphenylene ether, B) from about 1 to about 93.5% by weight of styrene polymer, C) from about 1 to about 20% by weight of flameproofing agent, D) from about 0.5 to about 10% by weight of expandable graphite, E) from about 0 to about 50% by weight of impact modifier and F) from about 0 to about 60% by weight of conventional additives.

4. A thermoplastic molding material as claimed in claim 1, wherein component D) is an intercalation compound comprising graphite and an inert compound, the liberation of which takes place at above about 240° C. at about atmospheric pressure.

5. A thermoplastic molding material as claimed in claim 4, the amount of the inert compound being at least 10% by weight, based on component D).

6. A thermoplastic molding material as claimed in claim 5, the inert compound being selected from $H_2O$, $CO_2$, $SO_3$ or $N_2$.

7. A thermoplastic molding material as claimed in claim 1, wherein the flameproofing agent used is resorcinol diphenyl phosphate or hydroquinone diphenyl phosphate.

8. A flame-retardant molding, fiber or film produced using a molding material as claimed in any of claims 1 to 7.

* * * * *

UNITED STATES PATENT AND TRADEMARK OFFICE
CERTIFICATE OF CORRECTION

PATENT NO.   : 6,197,869 B1
DATED        : March 6, 2001
INVENTOR(S)  : Weber et al.

It is certified that error appears in the above-identified patent and that said Letters Patent is hereby corrected as shown below:

<u>Column 13, claim 1,</u>
Line 27, "on e" should be -- one --.

<u>Column 14, claim 8,</u>
Line 33, "any of claims 1 to 7" should be -- claim 1 --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*